United States Patent [19]

Harris et al.

[11] Patent Number: 5,367,400
[45] Date of Patent: Nov. 22, 1994

[54] OPTIMAL FILLING OF A POLYGON FACET BY BEAM REPROFILING

[75] Inventors: Ellis D. Harris, Claremont; Vinod Mirchandani, Agoura, both of Calif.

[73] Assignee: Xerox Corporation, Stamford, Conn.

[21] Appl. No.: 990,492

[22] Filed: Dec. 14, 1992

[51] Int. Cl.$^5$ .............................................. G02B 26/08
[52] U.S. Cl. ..................................... 359/216; 359/569
[58] Field of Search ............... 359/17, 212, 216–219, 359/223, 226, 558, 565, 566, 569; 250/235, 236; 346/108, 160

[56] References Cited

U.S. PATENT DOCUMENTS

| | | | |
|---|---|---|---|
| 3,995,110 | 11/1976 | Starkweather | 359/217 |
| 4,978,185 | 12/1990 | Appel | 359/217 |
| 5,214,535 | 5/1993 | Harris et al. | 359/565 |
| 5,258,862 | 11/1993 | Harris | 359/565 |

Primary Examiner—Scott J. Sugarman
Assistant Examiner—James Phan

[57] ABSTRACT

A raster scanner system is disclosed which utilizes a pair of binary diffraction optic lenses to correct non-uniformity of the flux of a light beam received by a facet of a rotating polygon. Since the facet is rotating and the direction of the light is constant, the amount of the light (flux) which the facet receives in each position from the start of scan to the end of scan and in any position therebetween is different. Also, the light beam striking the rotating facet has a Gaussian distribution which is a contributor to the non-uniformity of the flux over one scan line. The binary diffraction optic lenses of this invention reprofiles the Gaussian distribution into a profile in which the intensity of the light beam gradually increases as the facet rotates to provide a uniform flux for the entire scan line.

5 Claims, 6 Drawing Sheets

OPTIMAL FILLING OF A POLYGON FACET BY BEAM REPROFILING

BACKGROUND OF THE INVENTION

This application is related to U.S. patent application titled "Pair of Binary Diffraction Optics for Use in Over Filled Raster Output Scanning Systems" Ser. No 07/990,491, filed concurrently herewith (common assignee), now U.S. Pat. No. 5,315,427.

This invention relates to correction of the non-uniformity of the flux in a raster scanner system over one scan line caused by the rotation of a polygon mirror.

Referring to FIG. 1, a conventional raster scanner system utilizes a light source 12 and a multi-faceted rotating polygon mirror 14 as the scanning element. The light source 12, which can be a laser source, produces a light beam 16 and sends it to the polygon 14 which has a plurality of facets, each of which is a plane mirror. The raster scanner system utilizes overfill scanning and therefore, the light beam 16 is directed onto at least two facets 18 of the rotating polygon mirror 14. Facets of rotating polygon mirror 14 reflect the light beam 16 and also cause the reflected light 16 to revolve about an axis near the center of rotation of the rotating polygon mirror 14 scanning a line. This reflected light beam can be utilized to scan a document at the input 19 of an imaging system or can be used to impinge upon a photographic film or a photosensitive medium 19, such as a xerographic drum at the output of the imaging system.

Many of the conventional raster scanner systems, which use overfill scanning, exhibit a light beam which has a varying flux over one scan line. The flux of the light beam is higher at the start of the scan line than at the end of the scan line for a given rotation direction of the polygon. If the variation of the flux (difference between the highest flux and the lowest flux) becomes more than a certain percentage of the highest flux, it can be observed on the printed document as darker prints at one end of the document and as lighter prints at the other end of the document. The problem comes mainly from the facet aspect change caused by rotation of the polygon. When a facet rotates from the start of scan position to the end of scan position, it losses some energy as it leaves one position and gains some energy as it enters a subsequent position. Due to the changing aspect typically, the lost energy is larger than the gained energy. Therefore, as the facet rotates, the total energy received by the facet decreases and as a result the total flux of energy, also decreases. If the polygon direction of rotation were reversed, the facet would gain energy as the polygon rotated. This problem is exasperated by the nonuniform nature of typical laser beams over their intensity profile.

SUMMARY

It is an object of this invention to correct the non-uniformity of the flux of a light beam in a raster scanner system by modifying the intensity of the light beam in such a manner that as a facet of a rotating polygon mirror rotates from start of scan to end of scan position, the intensity of the light striking the facet increases to compensate for the changing aspect of the polygon facet. The increasing rate of the intensity can be designed to keep the energy lost at the trailing edge of the rotating facet equal to the energy gained at the leading edge of the rotating facet and therefore, keep the flux uniform over the length of a scan line.

It is another object of this invention to modify the Gaussian distribution of the intensity of a light beam to an intensity profile in which the intensity of the light beam increases or decreases depending on the direction of the rotation of the facet.

DESCRIPTION OF THE PREFERRED EMBODIMENT

Figure 1:
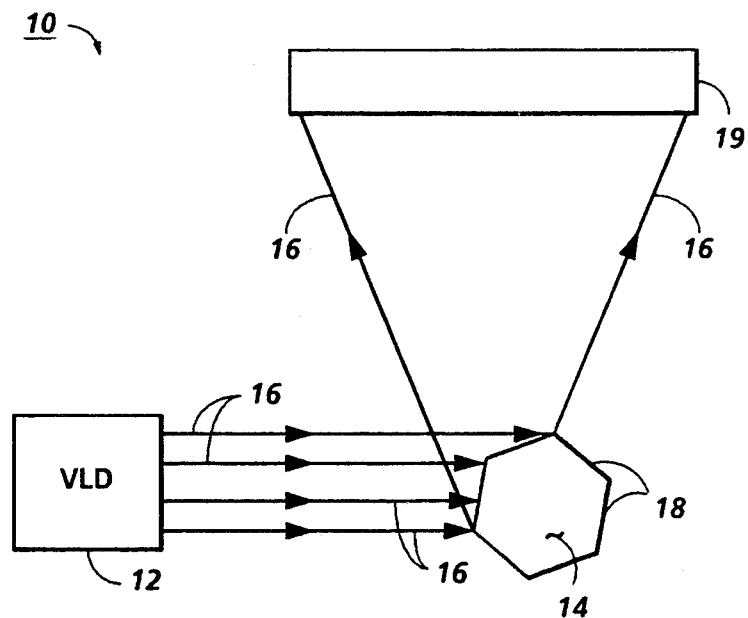
FIG. 1 is a tangential view of a prior art raster output scanner.
Figure 2:
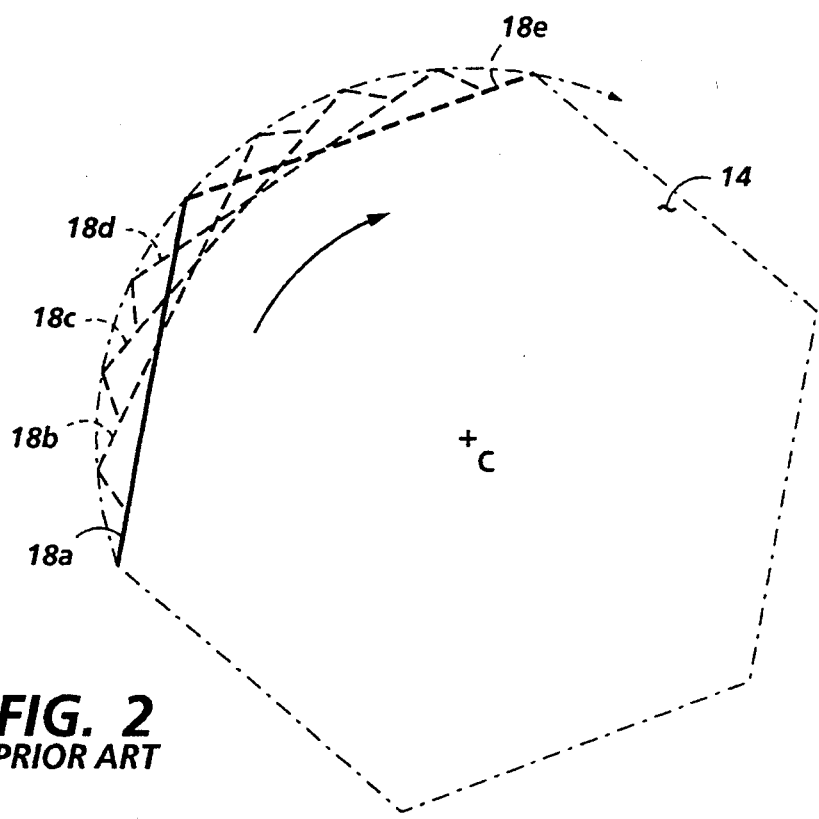
FIG. 2 shows a facet of the rotating polygon mirror of FIG. 1 in different positions from start of the scan to the end of the scan.

Referring to FIG. 2, a facet 18 is shown in different positions 18a, 18b, 18c, 18d and 18e while rotating about a center of rotation C. At the start of the scan (SOS), the facet 18 is located at position 18a. As the facet rotates, it gradually moves from position 18a to position 18e which is the end of the scan (EOS).

Figure 3:
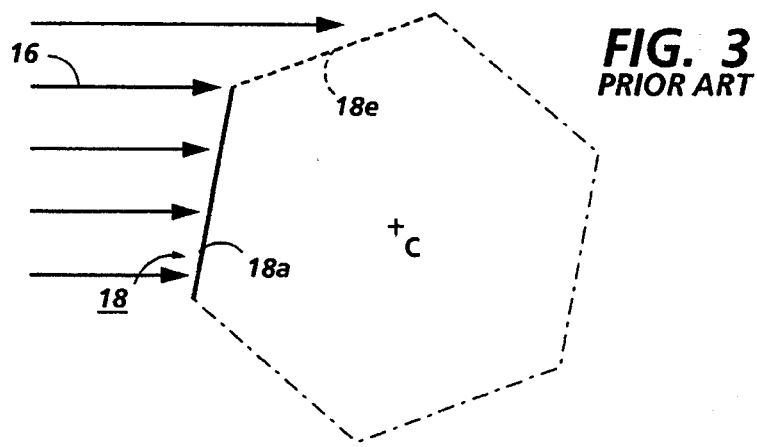
FIG. 3 shows a beam covering two facets of a the rotating polygon mirror of FIG. 1.

Referring to FIG. 3, the facet 18 is shown only at position 18a (start of the scan) and position 18e (end of the scan). In overfilled scanning, the light beam 16 striking the facet should be wide enough to cover at least two facets of the polygon. The reason for having the light beam cover two facets is that it should cover the entire width of the facet 18 at the start of the scan line, at the end of the scan line and while the facet is rotating between the start and the end of the scan line. Since the facet is rotating and the direction of the light is constant, the amount of the light (flux) which the facet 18 receives in each position could be different unless compensated. In order to determine the flux at each position along the scan line, the following analysis is necessary.

Figure 4:
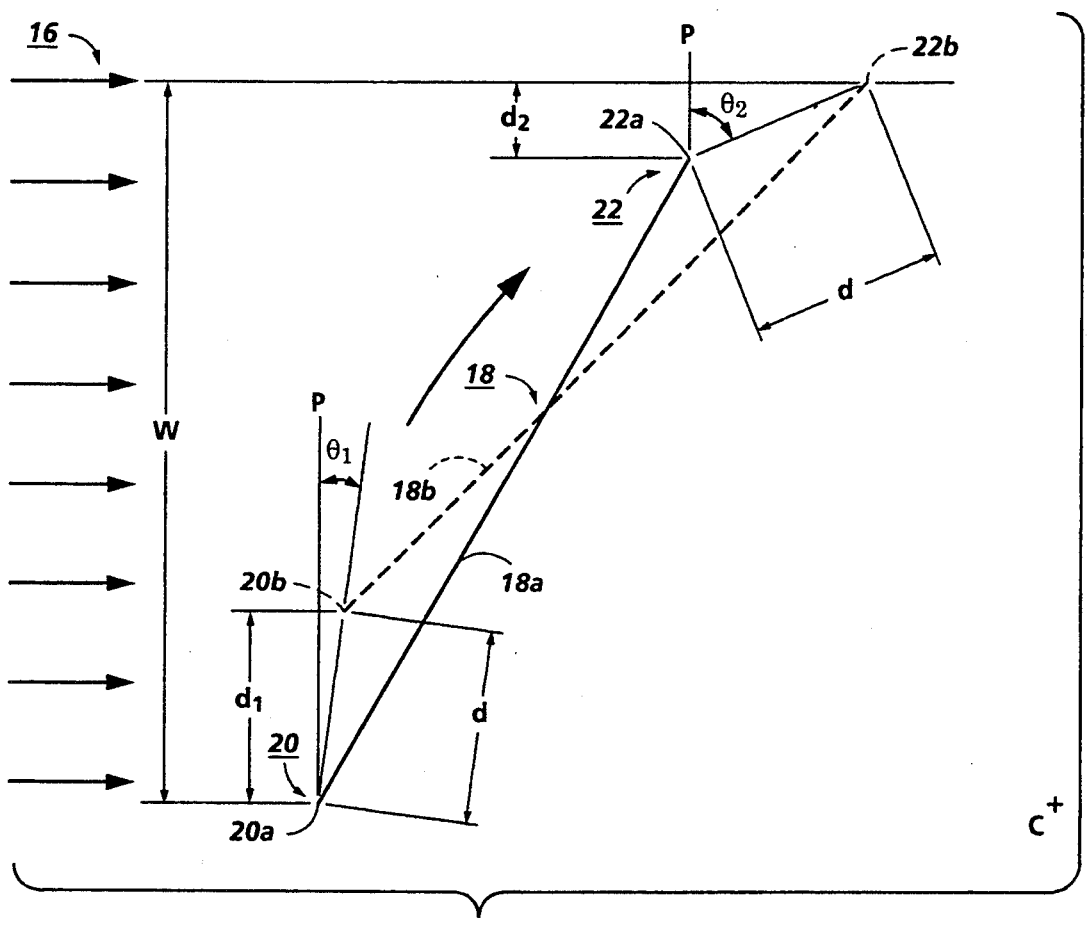
FIG. 4 shows the displacement of a trailing edge and a leading edge of a facet of the rotating polygon mirror of FIG. 1 as the facet rotates.

Referring to FIG. 4, initially the trailing edge 20 is at position 20a and the leading edge 22 is at position 22a. As the facet rotates, the trailing edge 20 moves from position 20a to position 20b and the leading edge 22 moves from position 22a to position 22b. The absolute displacement d between position 20a and position 20b is equal to the absolute displacement d between position 22a and position 22b. Distances $d_1$ and $d_2$ are, however, the projections of the displacement d of the facet 18 over a plane P perpendicular to the light beam 16. Hereinafter distances $d_1$ and $d_2$ will be referred to as vertical distances.

Let
- $\Theta_1$ = angle between the displacement d (between positions 20a and 20b) and the plane P.
- $\Theta_2$ = angle between the displacement d (between positions 22a and 22b) and the plane P.

Then the vertical distance $d_1$ is:
$d_1 = d \times \cos\Theta_1$
and the vertical distance $d_2$ is:
$d_2 = d \times \cos\Theta_2$.

As the facet rotates the angle between the displacement and the plane P increases. Since $\Theta_2$ is larger than $\Theta_1$, the vertical distance $d_2$ is smaller than the vertical distance $d_1$. The difference between the vertical distance $d_1$ and the vertical distance $d_2$ is the cause of the non-uniformity of the intercepted flux.

Let
- h = height (not shown, but perpendicular to the surface of the paper) of the facet.
- I = intensity of the incident light beam.

The amount of energy of the light on the facet for the vertical distance $d_1$ is:
$P_1 = I \times d_1 \times h$.

The amount of energy of the light on the facet for the vertical distance $d_2$ is:
$P_2 = I \times d_2 \times h$.

Assuming that the intensity of the light is uniform for the entire width w of the beam 16, the energy $P_1$ is more than the energy $P_2$ since the vertical distance $d_1$ is larger than the vertical distance $d_2$. When the facet rotates and when the facet trailing edge 20 moves from position 20a to position 20b, the facet looses the energy $P_1$. Also, when the facet leading edge 22 moves from position 22a to position 22b, the facet receives the additional energy $P_2$. Therefore, the energy $P_1$ is called lost energy and the energy $P_2$ is called gained energy. To have a uniform flux, the lost energy and the gained energy have to be equal. However, as it was mentioned, the gained energy is less than the lost energy. This causes the flux to decrease as the facet rotates. In addition, the intensity of the light beam which was assumed to be uniform may not be uniform which adds to the problem.

Figure 5:
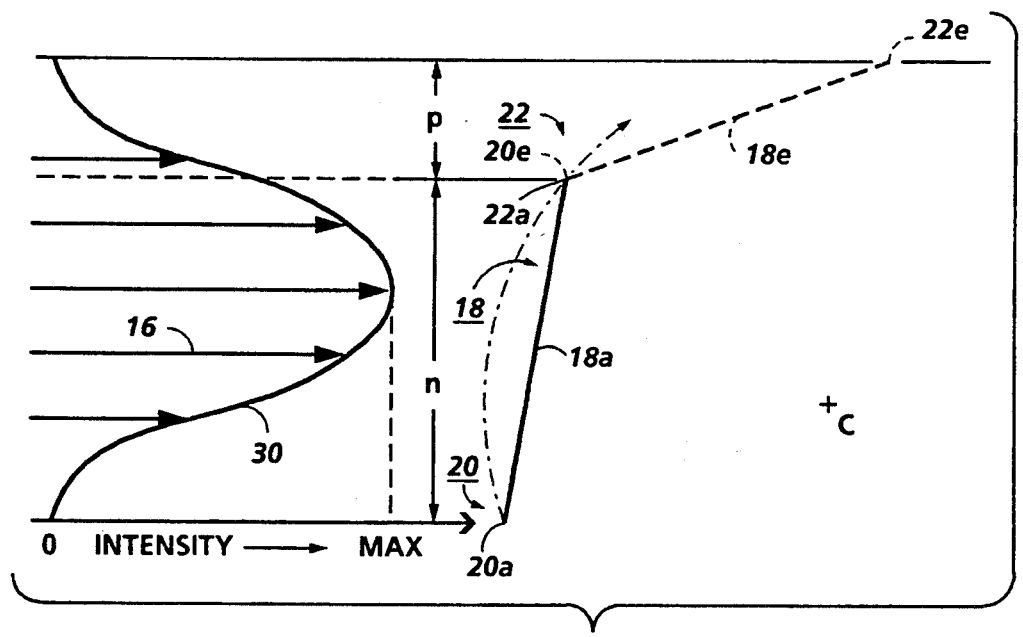
FIG. 5 shows a portion of the rotating polygon mirror of FIG. 1 receiving a light beam with a Gaussian distribution.

Referring to FIG. 5, there is shown a Gaussian distribution 30 of the intensity of the light beam 16 which covers the facet 18 in position 18a at the start of the scan line, in position 18e at the end of the scan line and also in any position therebetween while the facet is rotating. As the facet trailing edge 20 moves from start of scan position 20a to end of scan position 20e, it moves from a low intensity light zone and it enters into a higher intensity light zone. On the contrary, as the facet leading edge 22 moves from start of scan position 22a to end of scan position 22e, it moves from a high intensity light zone into a low intensity light zone. Therefore, as the facet 18 rotates the net lost energy is exaggerated by the Gaussian distribution 30.

Figure 6:
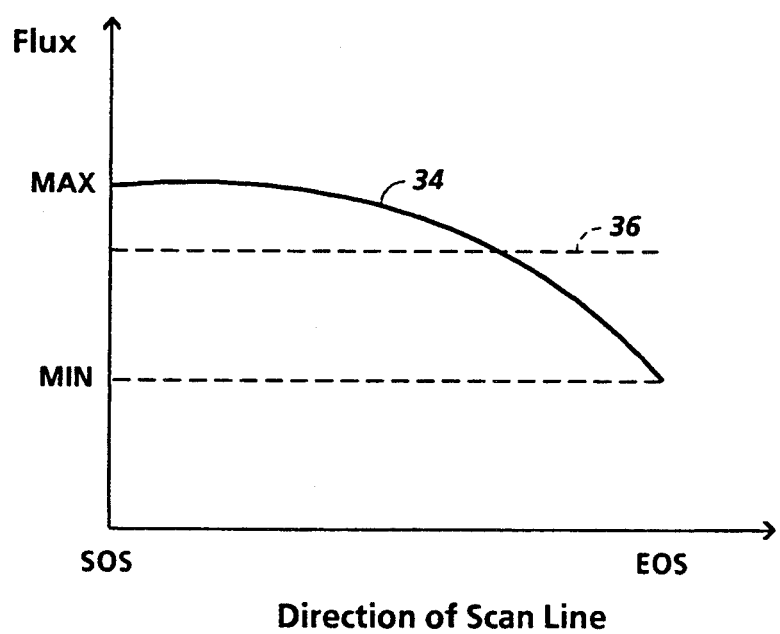
FIG. 6 shows a curve of a flux of a reflected light beam by a facet of a rotating polygon mirror from the start of the scan to the end of the scan.

Referring to FIG. 6, there is shown a curve 34 of the flux received by the facet as the facet rotates. The light beam has the maximum flux at the start of the scan (SOS) and as the facet rotates, the flux of the light received by the facet 18 decreases. At the end of the scan line (EOS) the flux of the light received by the facet 18 is at its minimum. The object of this invention is to modify the raster scanner system to provide a uniform flux to a photosensitive medium as illustrated by the curve 36 which depicts a generally constant flux received by the facet throughout its rotation from the start of scan to the end of scan.

Figure 7:
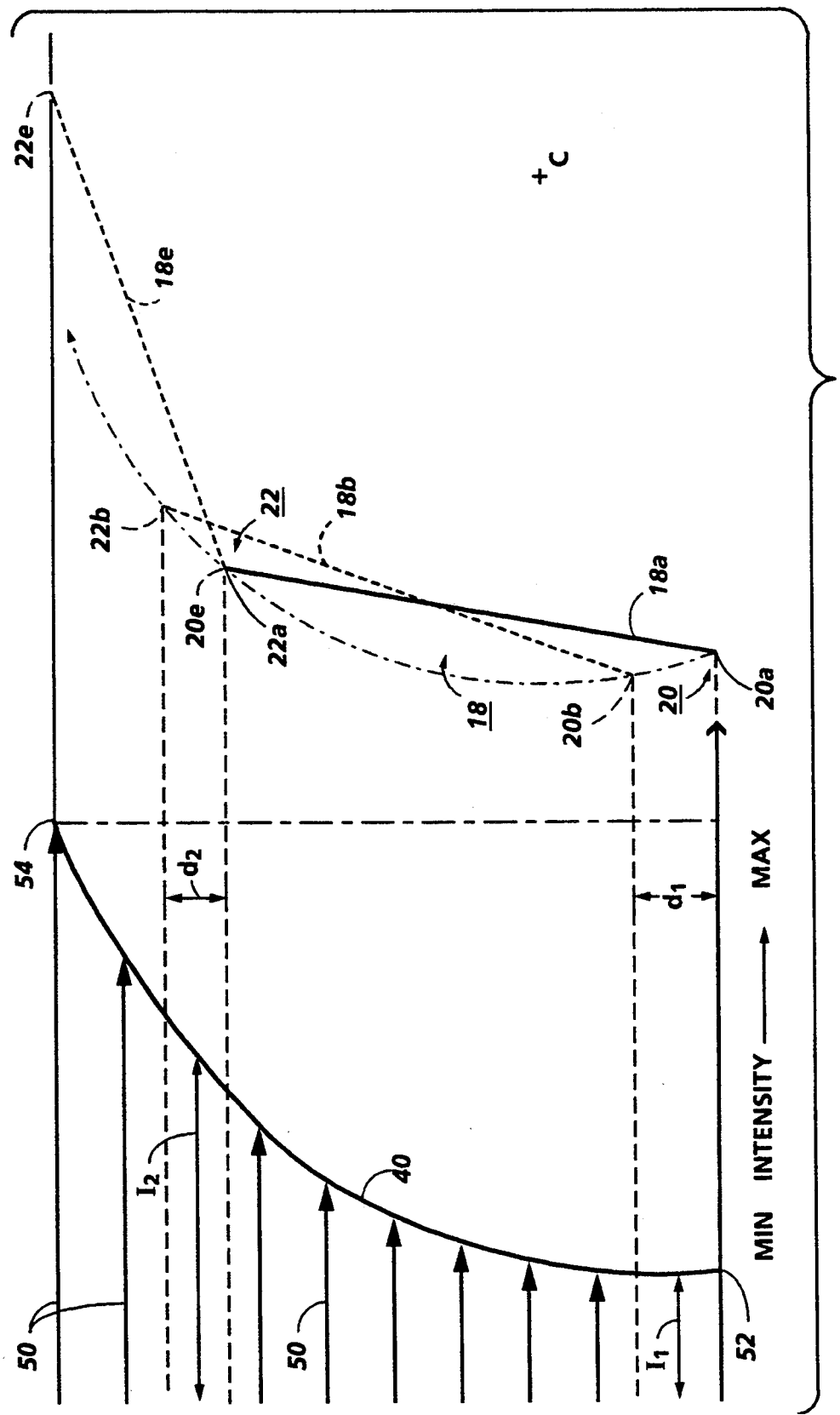
FIG. 7 shows a facet of a rotating polygon mirror receiving a reprofiled light beam at the start of the scan and at the end of the scan and in one position between the start of the scan and the end of the scan.

Referring to FIG. 7, there is shown a profile 40 of the intensity of the light beam suggested by this invention to solve the problem of the non-uniformity of the flux. The light beam 50 covers the facet 18 both in position 18a at the start of the scan and in position 18e at the end of the scan. Based on the intensity profile 40, the intensity of the light beam 50 increases from point 52 to point 54.

Let
- $d_1$ = vertical displacement of the facet trailing edge 20 between positions 20a and 20b through the rotation of the facet by a small angle.
- $d_2$ = vertical displacement of the facet leading edge 22 between positions 22a and 22b through the rotation of the facet by the small angle.
- $I_1$ = intensity of the light beam for the vertical displacement $d_1$.
- $I_2$ = intensity of the light beam for the vertical displacement $d_2$.

The lost energy:
$P_1 = I_1 \times d_1 \times h$
can be equal to the gained energy:
$P_2 = I_2 \times d_2 \times h$
If
$P_1 = P_2$
which implies
$I_1 d_1 = I_2 d_2$,
then
$I_1/I_2 = d_2/d_1$.

With this profile 40, the lost energy and the gained energy are kept the same while the facet rotates. Keeping the energy lost at the trailing edge 20 and the energy gained at the leading edge 22 equal, provides a constant flux while the facet rotates and corrects the energy non-uniformity of the incident flux.

To correct the energy non-uniformity of the incident flux, a pair of binary diffraction optic (BDO) lenses are used. Binary diffraction optic lenses are made using the same techniques used to fabricate VLSI circuits, as disclosed in Binary Optics Technology: The Theory and Design of Multi-level Diffractive Optical Elements by G. J. Swanson of the Lincoln Laboratory at the Massachusetts Institute of Technology, (Technical Report 854, Aug. 14, 1989) and the resulting U.S. Pat. No. 4,895,790. A designer develops an idealized diffractive surface structure mathematically, then using a computer, defines a series of precise, microlithographic masks. A mask pattern is printed into a photoresist coating using a UV light source and then transferred into the optical substrate by ion milling or plasma etching.

Figure 8:
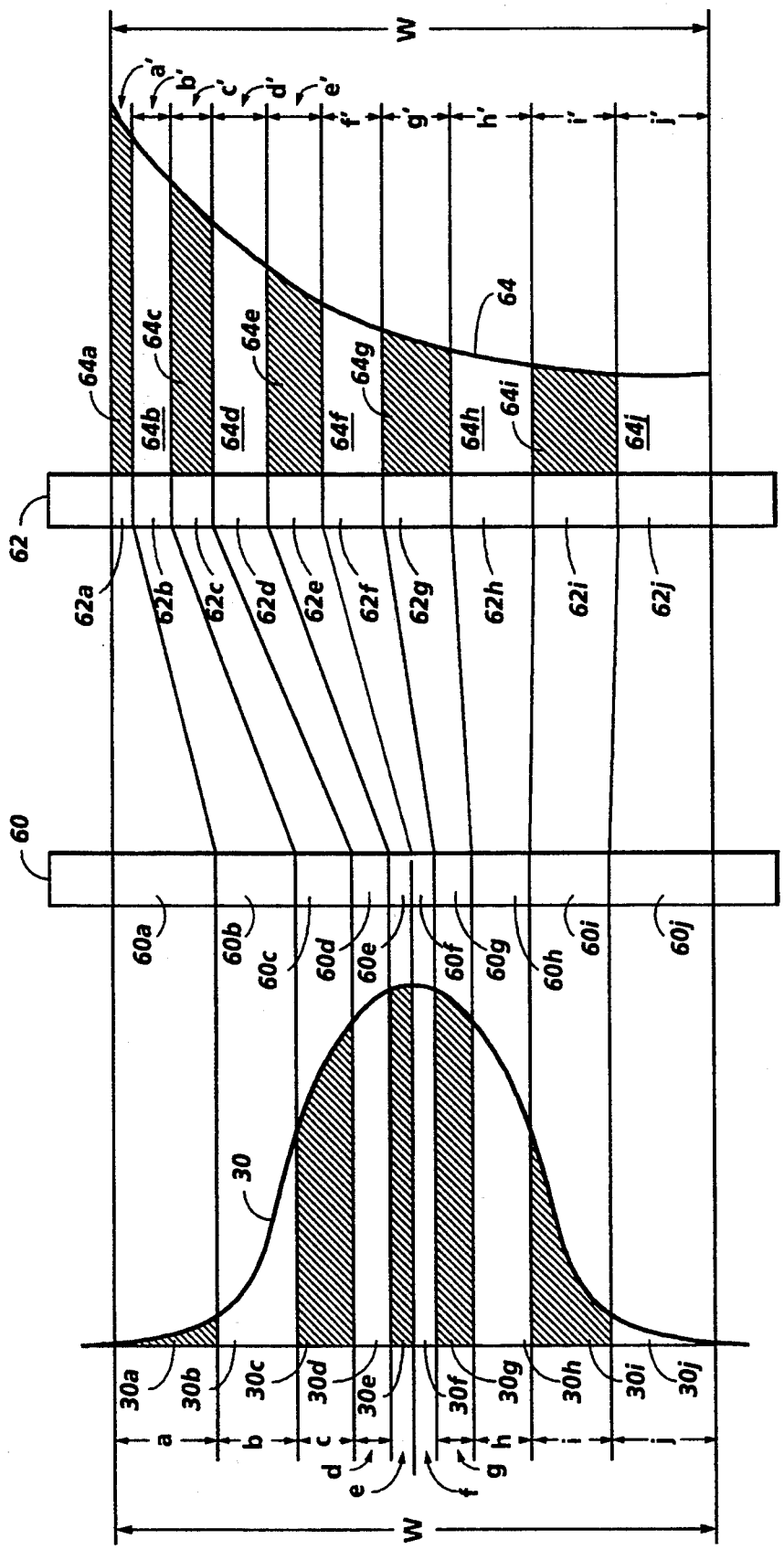
FIG. 8 shows a Gaussian distribution reprofiled to a profile suggested by this invention by a pair of binary diffraction optic lenses of this invention.

Referring to FIG. 8, a typical beam which is striking the polygon has a Gaussian distribution 30. In this invention, by using two binary diffraction optic lenses 60 and 62, the Gaussian distribution of the light beam is changed to profile 64 which increases as the facet rotates. The profile 64 is based upon the same principal as profile 40 of FIG. 7.

To design binary diffraction optic lenses 60 and 62 which can accomplish such profiling, the Gaussian distribution is divided into infinitesimal sections of equal energy bands 30a, 30b, 30c, 30d, 30e, 30f, 30g, 30h, 30i and 30j. Each one of the bands 30a, 30b, 30c, 30d, 30e, 30f, 30g, 30h, 30i and 30j has a width a, b, c, d, e, f, g, h, i and j respectively. The bands closer to the center of Gaussian distribution such as band 30e are narrower and have more intensity and the bands closer to the sides of the Gaussian distribution such as 30a are wider and have less intensity. However, the energy for all the bands is the same.

Also, the profile 64, which has a width w which could be equal to the width w of the Gaussian distribution 30, has to be divided into corresponding infinitesimal bands 64a, 64b, 64c, 64d, 64e, 64f, 64g, 64h, 64i and 64j, but of decreasing intensity according to $I_1/I_2 = d_2/d_1$. Each one of the bands 64a, 64b, 64c, 64d, 64e, 64f, 64g, 64h, 64i and 64j has a width a', b', c', d', e', f', g', h', i', and j' respectively.

To convert the Gaussian distribution 30 into profile 64, each one of the binary diffraction optic lenses 60 and 62 has to be designed to have a separate segment for each band. It should be noted that each segment has a plurality of infinitesimal stepped wedges (see FIGS. 9A and 9B). The binary diffraction optic lens 60 has segments 60a, 60b, 60c, 60d, 60e, 60f, 60g, 60h, 60i and 60j each one of which is designed to convert the bands 30a, 30b, 30c, 30d, 30e, 30f, 30g, 30h, 30i and 30j into bands 64a, 64b, 64c, 64d, 64e, 64f, 64g, 64h, 64i and 64j respectively. The binary diffraction optic lens 62 has segments 62a, 62b, 62c, 62d, 62e, 62f, 62g, 62h, 62i and 62j each one of which is designed to collimate each one of the bands 64a, 64b, 64c, 64d, 64e, 64f, 64g, 64h, 64i and 64j respectively.

For example, segment 60a of the BDO 60 has to be capable of receiving band 30a and converging it in such a manner that when the band 30a strikes a facet, it will have a narrower width. The energy of each band is defined to satisfy the relationship $I_1/I_2 = d_2/d_1$. However, since the band 30a has a narrower width a' and the energy is constant, the intensity increases. In other words, if a wide band of light is compressed into a narrower band the intensity of the narrower band increases.

On the contrary, segment 60e of the BDO 60 has to be designed to be capable of receiving band 60e, diverging and if needed deflecting the band in such a manner that when it strikes a facet, it will have a wider width e'. Since the width e' is wider and the energy is constant, the intensity decreases.

Figure 9:
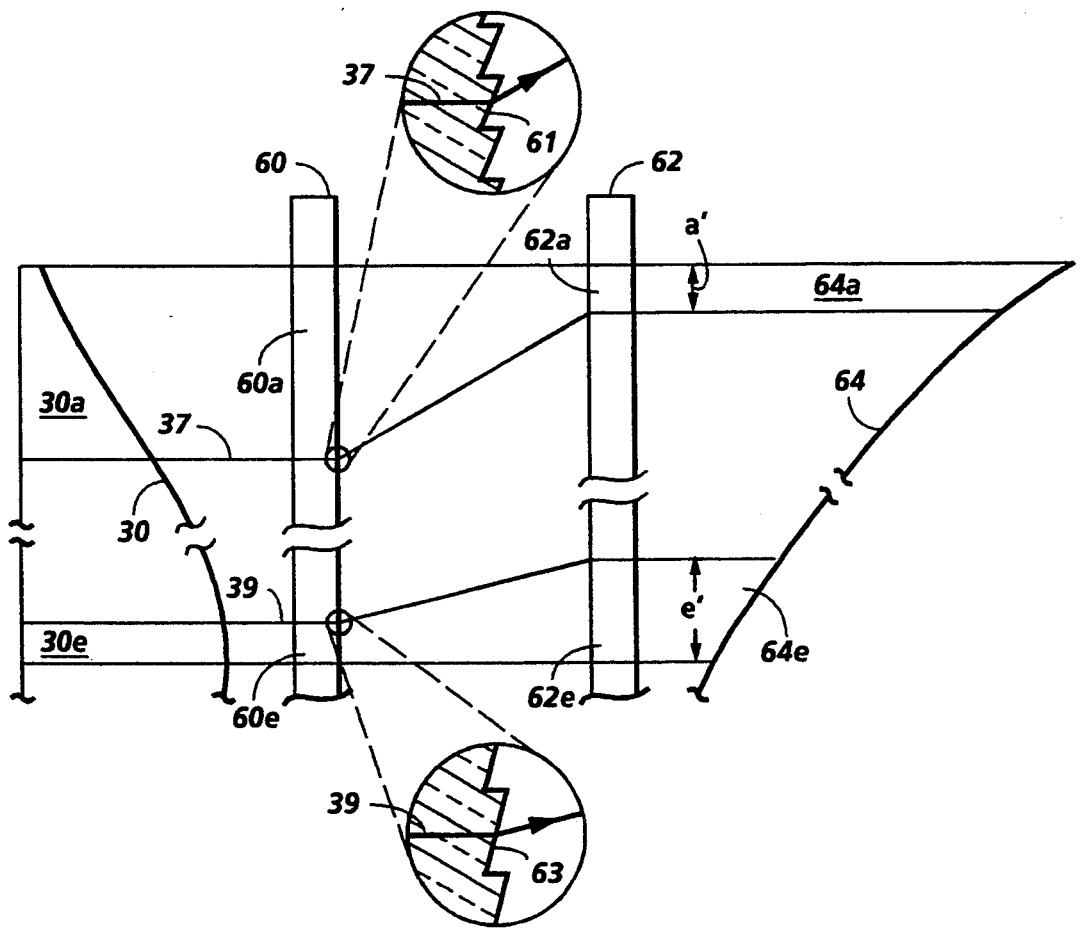
FIG. 9 is a partial view of FIG. 8 showing a representative magnified exaggerated lower portion of segment 60a and a representative magnified exaggerated upper portion of segment 60e.

FIG. 9 is a partial view of FIG. 8 showing a representative magnified exaggerated lower portion of segment 60a and a representative magnified exaggerated upper portion of segment 60e. As the lower edge 37 of band 30a passes through the segment 60a and exits from one of the stepped wedges 61 of the segment 60a, it deflects. As the upper edge 39 of band 30e passes through the segment 60e, it deflects.

Referring back to FIG. 8, by converging the bands 30a and 30b through segments 60a and 60b of the BDO 60 and depending on the intensity and the width of each band by diverging or converging the bands 30c, 30d, 30e, 30f, 30g, 30h, 30i and 30j through segments 60c, 60d, 60e, 60f, 60g, 60h, 60i and 60j a profile such as profile 64 is generated. It should be noted that depending on the desired profile, it might be necessary to have some segments of the BDO 60 to direct the bands through without diverging or converging the bands. This profile 64 has more intensity where the facet leading edge 22 gains energy and has less intensity where the facet trailing edge 20 losses energy.

It should be understood that the number of the equal energy bands and therefore, the number of the segments of the BDO can be modified to meet the requirements of different polygon mirrors. In application, the segments are so small that the intensity profile change is essentially continuous. Furthermore, it should also be understood that in order to meet the intensity requirements of different polygons with a different number of facets, the suggested intensity profile 64 should be modified to have the proper intensity distribution. However, the shape of the intensity profile which has a low intensity at one end of the profile and a high intensity at the other end of the profile will be similar. Also, polygon rotation direction could be reversed with similar results.

Placing a BDO pair, such as 60 and 62, which can convert the Gaussian distribution into a profile suggested by this invention, between a laser diode and a polygon solves the problem of nonuniformity of the flux and provides a uniform flux for the entire scan line.

What is claimed is:

1. A raster scanning system comprising:
   a light source emitting a light beam having an intensity distribution;
   beam intensity reprofiling means being so constructed and arranged to receive the light beam from said light source and reprofile the intensity distribution of the light beam to a given intensity distribution profile;
   a photosensitive medium;
   a rotating scanning means having a plurality of reflecting surfaces arranged to receive the light beam with the given intensity distribution profile from said beam intensity reprofiling means and scan the light beam with the given intensity distribution profile across said photosensitive medium;
   the given intensity distribution profile having a width greater than each of said reflecting surfaces of said rotating scanning means;
   the width of the given intensity distribution profile having a first end and a second end; and
   the given intensity distribution profile intensity increasing from the first end to the second end of the width in such a manner to provide a uniform flux for the light beam reflected by said reflecting surfaces of said rotating scanning means onto said photosensitive medium over one scan line.

2. The raster scanning system recited in claim 1, wherein said beam intensity profiling means comprises a pair of binary diffraction optic lenses spaced from each other along the path of the beam, one of said pair of binary diffraction optic lenses comprises means for converging and diverging portions of the light beam and said other binary diffraction optic lens comprises means for collimating the light beam.

3. The raster scanning system recited in claim 1, wherein the given intensity distribution profile of the light beam at said reflecting surfaces increases in the direction of rotation of said rotating scanning means.

4. The raster scanning system recited in claim 1, wherein the given intensity distribution profile of the light beam at said reflecting surfaces decreases in the direction of rotation of said rotating scanning means.

5. The raster scanning system recited in claim 1, wherein said beam intensity profiling means comprises a binary diffraction optic lens, said binary diffraction optic lens comprises means for converging portions of said light beam to compress said portions of the light beam and for diverging portions of said light beam to expand said portions of the light beam to change the intensity of said portions of said light beam.

* * * * *